(Model.)

A. H. WALLIS.
PITCH CHAIN.

No. 254,739. Patented Mar. 7, 1882.

Witnesses.
Robert Everett.
J. A. Rutherford

Inventor.
Arthur H. Wallis.
By James L. Norris.
Atty.

UNITED STATES PATENT OFFICE.

ARTHUR H. WALLIS, OF BASINGSTOKE, COUNTY OF HANTS, ENGLAND.

PITCH-CHAIN.

SPECIFICATION forming part of Letters Patent No. 254,739, dated March 7, 1882.

Application filed October 17, 1881. (Model.) Patented in England September 15, 1881.

*To all whom it may concern:*

Be it known that I, ARTHUR HERBERT WALLIS, a citizen of England, residing at Basingstoke, in the county of Hants, England, engineer, have invented an Improved Construction of Pitch-Chain, (for which I have obtained a patent in Great Britain, No. 3,984, bearing date September 15, 1881,) of which the following is a specification.

My invention relates to a construction of pitch-chain such as is employed for driving one wheel from another, or for elevating, dredging, and the like operations, the object of my invention being to provide a chain consisting of equal and symmetrical links that can be readily put together or taken apart, these links being secured against lateral opening resulting from strain, and, when desired, being provided with means of taking up slackness resulting from wear.

I will describe the construction which I adopt for this purpose, referring to the accompanying drawings.

Figure 1:
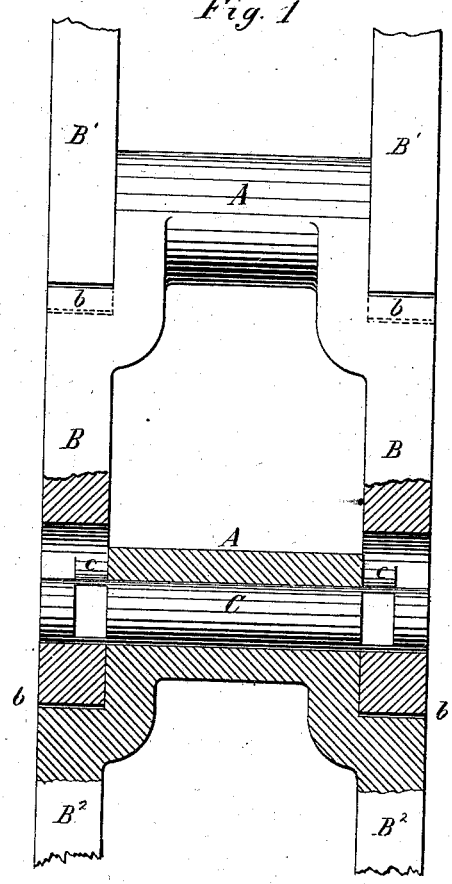
Figure 3:
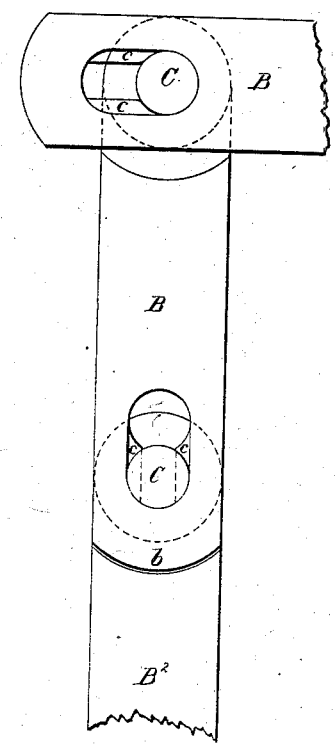
Figure 2:
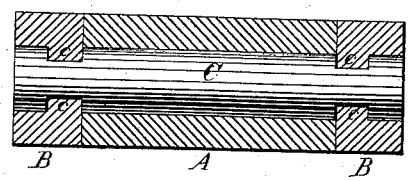
Figure 4:
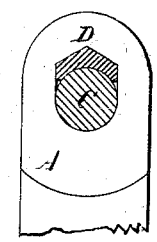

Figure 1 is a front view of part of a chain according to my invention with one of the joints shown in section. Fig. 2 is a transverse section of the joint, and Fig. 3 is a side view with part of one of the links turned at right angles to the line of chain. Fig. 4 is a side view of the boss of a link, showing how it may be bushed to provide for wear.

Each link consists of a tubular boss, A, with two fork-arms, B B, projecting from it. Through the boss A there is a plain round hole to receive a round pin, C. In the two forks B B there are slotted or elongated holes, and each of these holes has next its inner face internally-projecting ribs c, which extend from the front end of the slotted hole about half-way backward. The pin C is notched at its sides, each notch being of such size and shape as to admit one of the ribs c.

In putting the links together each link is turned at right angles, or nearly so, to the other, (as indicated in respect of the link B' at the right hand of Fig. 3,) and pushed forward, its one side being guided along the shoulder b of the next link. The pin C can then be introduced behind the projecting ribs c c of the slotted holes in B', and then, B' being drawn backward, the ribs c c enter the notches of the pin C, whereupon the link B' is turned so as to lie in a straight line, or nearly so, with B. In this condition of the links the pin C cannot move lengthwise, being held by the ribs c engaged in its notches, nor can the forks B B be opened apart by undue strain, as the shoulders of the notches of the pin C hold them in position. Moreover, the notched part of the pin C, being held by the ribs c c as in a wrench, is compelled to turn along with the forks of the one link in the hole of the boss A of the next link, and thus the wear of the pin and its bearing is distributed over the long cylindrical surface in A.

In cases where it is desirable to take up excessive slack resulting from wear the hole in the boss A may be elongated to partly hexagonal form, as shown in Fig. 4, and a partly hexagonal bush, D, can be introduced to take the wear of the pin, a fresh bush being inserted in place of a previous bush when worn. Such bushes may obviously be made of other than hexagonal form, provided they be of such shape that they cannot turn in the hole. Also, instead of providing two ribs, c c, in each slotted hole of the forks B, there may be only a single rib at one side of each hole engaging in a single notch of the pin C, and the notch or notches of the pin might be variously shaped. It is of advantage to make them symmetrical, so that the pin fits either way, and that when one side of it is worn it can be turned half round.

As in the use of chains of this kind the links are never turned so far as to stand at right angles to each other, like B', Fig. 3, the pins C cannot come out in working, the shoulders b of the one link preventing the forks of the next link from shifting forward, so as to let the notched pin pass clear of the ribs c c; but when it is required to take the chain apart a link can be turned to the attitude of B' and shifted forward, and thereupon the pin C can be taken out.

Having thus described the nature of my invention and in what manner the same can be carried into practical operation, I claim—

1. The combination, in a pitch-chain, of the links, each consisting of a tubular boss, A, provided with slotted fork-arms B, and having ribs c within the slots of said arms, with the notched pins C, passing through the tubular boss of one link and through the ribbed hole or slot in the fork-arms of the next adjoining link, substantially as described.

2. In a pitch-chain, the bush D, fitted in the elongated hole of the boss A, substantially as and for the purpose set forth.

In testimony whereof I have signed my name to this specification, in the presence of two subscribing witnesses, this 6th day of October, A. D. 1881.

ARTHUR HERBERT WALLIS.

Witnesses:
OLIVER IMRAY,
HAROLD IMRAY.